Figure 1:
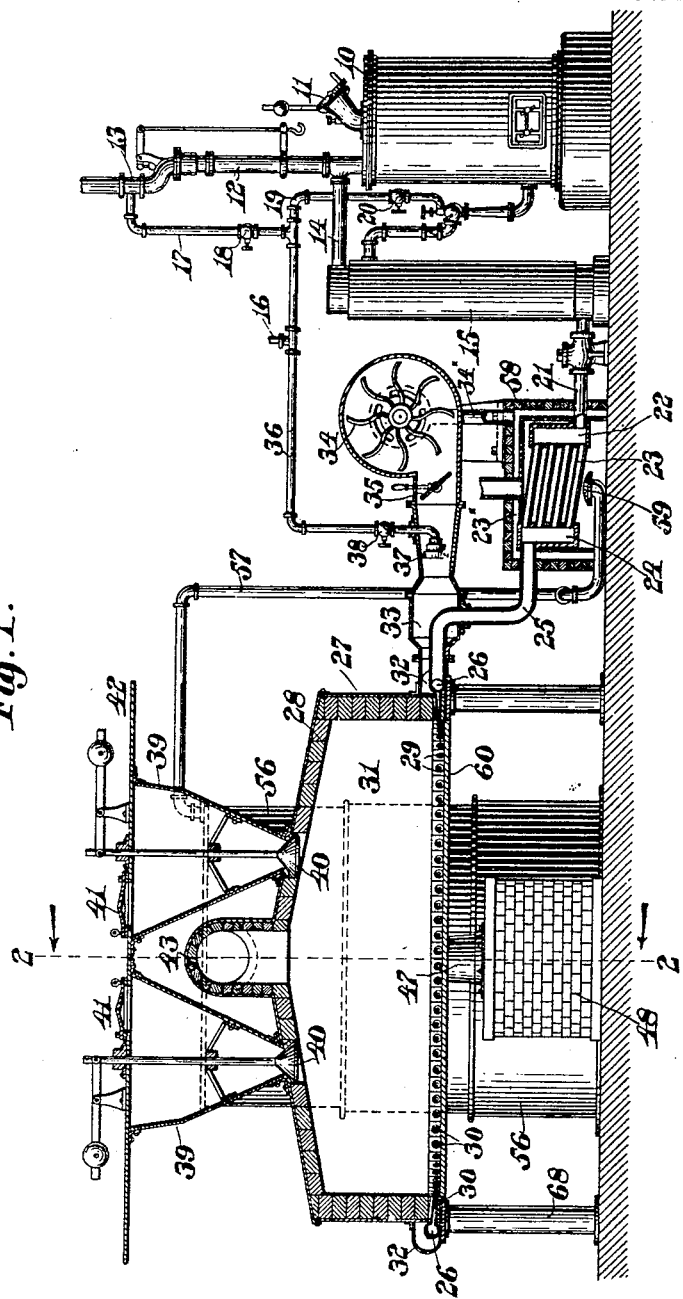

No. 865,309. PATENTED SEPT. 3, 1907.
A. D. LEE.
APPARATUS FOR ROASTING ORES AND SEPARATING BY-PRODUCTS THEREFROM.
APPLICATION FILED SEPT. 27, 1906.

3 SHEETS—SHEET 1.

Witnesses:
Nathan C. Lombard
George W. Beadle

Inventor:
Alva D. Lee,
by Walter E. Lombard,
Atty.

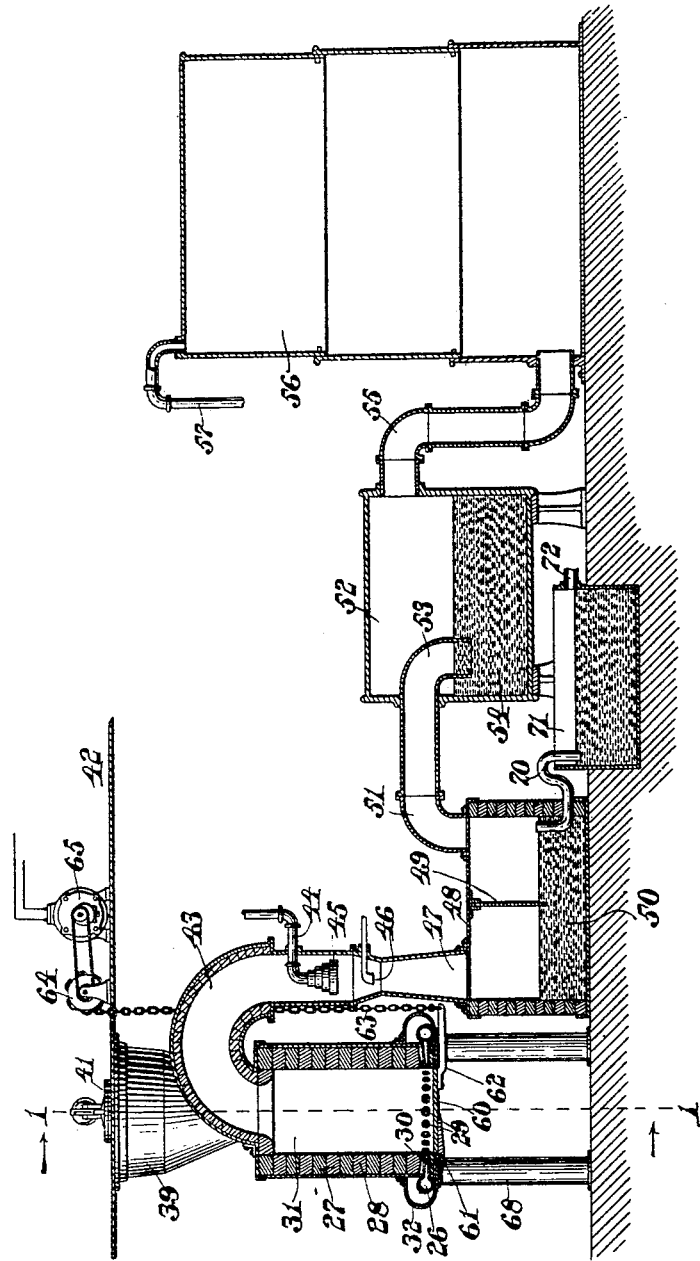

No. 865,309. PATENTED SEPT. 3, 1907.
A. D. LEE.
APPARATUS FOR ROASTING ORES AND SEPARATING BY-PRODUCTS THEREFROM.
APPLICATION FILED SEPT. 27, 1906.
3 SHEETS—SHEET 3.
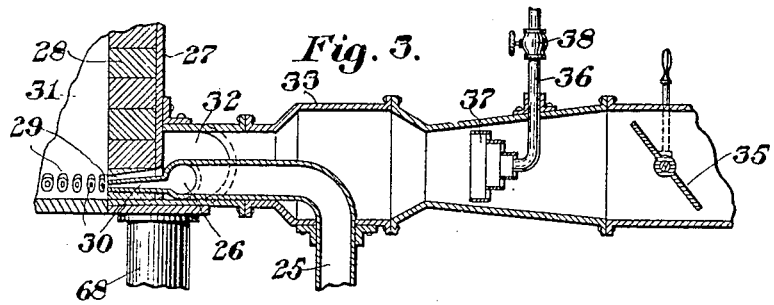
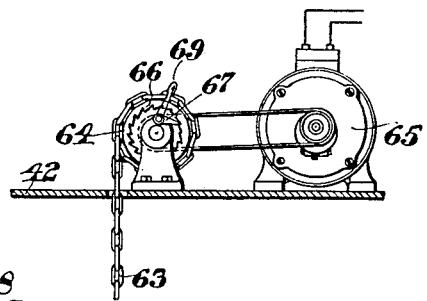
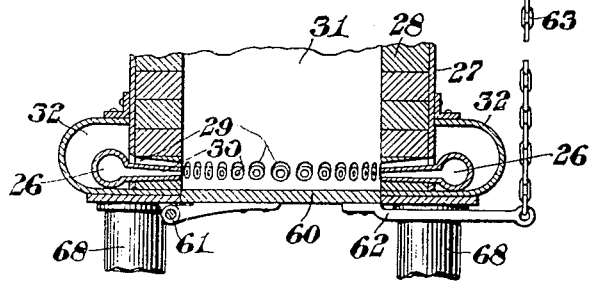
Witnesses:
Nathan C. Lombard
George W. Beadle
Inventor:
Alva D. Lee,
by Walter E. Lombard,
Atty.

UNITED STATES PATENT OFFICE.

ALVA D. LEE, OF BROOKLINE, MASSACHUSETTS.

APPARATUS FOR ROASTING ORES AND SEPARATING BY-PRODUCTS THEREFROM.

No. 865,309.     Specification of Letters Patent.     Patented Sept. 3, 1907.

Application filed September 27, 1906. Serial No. 336,399.

*To all whom it may concern:*

Be it known that I, ALVA D. LEE, a citizen of the United States of America, and a resident of Brookline, in the county of Norfolk and State of Massachusetts, have invented certain new and useful Improvements in Apparatus for Roasting Ores and Separating the By-Products Therefrom, of which the following is a specification.

This invention relates to apparatus for roasting and calcining ores for the purpose of obtaining therefrom the metals in a comparatively pure state and at the same time by volatilization and precipitation obtain any by-products which may be contained in said ores.

The invention consists in certain novel features of construction and arrangement of parts which will be readily understood by reference to the description of the drawings and to the claims to be hereinafter given.

Of the drawings: Figure 1 represents a section on line 1—1 on Fig. 2, looking in the direction of the arrow, certain of the devices used being shown in elevation. Fig. 2 represents a section on line 2—2 on Fig. 1, looking in the direction of the arrow. Fig. 3 represents an enlarged section showing the conduits and inlets communicating with the furnace chamber, and Fig. 4 represents an enlarged section showing the hinged bottom and the means for closing the same.

Similar characters designate like parts throughout the several figures of the drawings.

In the drawings, 10 represents a suitable gas producer provided at 11 with a charging device while 12 represents the gas outlet in which is located the relief valve 13. A branch pipe 14 leads to the air heater 15 of any well-known construction. A pipe 16 leads from any suitable source of steam supply to the outlet 12 through a pipe 17 provided with the valve 18 and to the gas producer 10 through a pipe 19 provided with the valve 20 therein.

Steam may be admitted to the outlet 12 through the pipe 17 for the purpose of producing an out draft or through the pipe 19 to the gas producer 10 to produce an inward draft to said gas producer, all in any well-known manner, this particular apparatus forming no feature of this invention.

A pipe 21 communicates with the air heater 15 and discharges gas from said heater through said pipe into a drum 22 which is connected by means of a plurality of supply pipes 23 to a drum 24 being provided at its upper end with an outlet 25, the opposite end of which enters a pipe 26 surrounding the base of the furnace casing 27. The casing 27 is provided with a lining 28 of fire bricks, or other similar material. Each of the bricks in the lower course is provided with an air passage 29 through each of which projects a gas nozzle 30 projecting from said gas pipe 26. The nozzle 30 is made of much smaller diameter than the air passage 29 so that air is admitted to the chamber 31 within the furnace casing 27 around the outer periphery of each of said gas nozzles.

The pipe 26 surrounds the base of the furnace casing 27 and is inclosed by means of a casing 32 forming an air conduit around said furnace casing, said conduit communicating with a radial conduit 33 the opposite end of which is provided with a blower 34 adapted to force air through said conduits 32–33 and the passages 29 into the interior of the chamber 31. A damper 35 or other closing device is provided in the conduit 33 to shut off the air entirely or limit the amount forced into the chamber 31. From the steam pipe 16 the pipe 36 extends into the conduit 33 and terminates in an aspirator 37, said aspirator being designed to create a draft through said conduit 33. The temperature of the steam passing through the conduit 33 is raised to a high degree by commingling with the superheated air being forced by the blower 34 through said conduit on its way to the furnace 27. This superheated air is drawn by means of the blower 34—34* from a chamber 23* surrounding the superheater 23. The pipe 36 is provided with a valve 38 by which the amount of steam passing to the aspirator may be regulated.

The furnace 27 is provided with a plurality of charging cones 39 provided with suitable closing valves 40. Communication is had to said charging cones by means of the doors 41 in the charging floor 42. These devices are made air tight so that any fumes or gases which may be generated within the chamber 31 will be prevented from escaping through these charging cones. At the top of the casing 27 is an outlet 43 extending upwardly and then curved downwardly as shown in Fig. 2, this outlet 33 being suitably lined with fire bricks or similar material. Into the outer vertical portion of said outlet 43 a steam pipe 44 extends the inner end of said pipe being provided with an aspirator 45 through which steam may be passed for the purpose of producing in said outlet 43 a down draft, producing a vacuum therein which will create a suction and draw from the chamber 31 the fumes and gases generated therein. Beneath said aspirator 45 is a water spray 46 communicating with any suitable source of supply. The outlet 43 communicates at its lower end 47 with a closed tank 48 provided with a baffle plate 49 extending downwardly into the water located in the bottom of said tank thereby practically separating the tank 48 into two chambers and obliging the fumes and gases passing from said outlet 43 to pass through the water 50 contained in the bottom of said tank into the other chamber in said tank. The second chamber is provided with a gas outlet 51 which communicates with a second tank or receptacle 52, the outer end 53 of said gas outlet 51 extending downwardly into the liquid material 53 which may be contained therein. This liquid material 54 may be any re-agent or any other acid solution the nature of which is determined by the character of the ore being treated.

From the tank 53 extends a gas outlet 55 communicating with the gasometer 56 of any well-known construction. The fumes and gases generated within the chamber 31 are forced by means of the vacuum draft created by the aspirator 45 through the plurality of scrubbers 48—52 into the gasometer 56 in which said gas is stored and from which it may pass through a pipe 57 the opposite end of which extends into the casing 58 containing the superheater 22—23—24, the outlet end of the pipe 57 being provided with a burner 59 located beneath the pipes 23 so that gas from the gasometer 56 may pass through said pipe into the burner 59 and when ignited form an intense heat beneath the pipes 23 to thoroughly heat the gas passing through said pipes and drum 24 into the interior of the chamber 31 of the roasting furnace. The furnace casing 27 is provided with an arm 62 to which a chain 63 is attached the opposite end of said chain being secured to a revoluble drum 64 operated by any suitable motor 65 located upon the charging floor 42 or in any other convenient place.

The revoluble drum 64 is provided with a suitable internal ratchet 66 coöperating with a pawl 67 to retain the bottom 60 normally in closed position. The furnace casing 27 is elevated upon suitable columns or supports 68 which will permit the bottom 60 to be opened when desired to discharge from said closed chamber the ores which have been treated. The opening of said bottom is controlled by the handle 69 which releases the pawl 67 from the ratchet 66 and permits the bottom to be dropped by its weight and the weight of the material thereon. The bottom may be again closed when the furnace has been discharged by means of the motor 65. From the bottom of the tank 48 is a trapped pipe 70 extending into a settling tank 71 provided with an overflow 72.

In the operation of the invention suitable gas for heat is first produced in the producer 10 and is passed through the air heater 15 passing therefrom into the superheater pipes 23 where the temperature of the gas is raised to a high degree, as, for instance, 1800° Fahrenheit, this gas at this high temperature passing through the pipe 25 into the interior chamber 31 of the roasting furnace 27 which has been previously provided with a layer of any suitable fuel, such as wood, coke, peat, or coal. The gases admitted through the gas inlets or nozzles 30 are ignited and cause said fuel to assume a white heat. When the fuel has been sufficiently heated the ore which it is desired to treat is passed into said furnace upon said heated fuel through the charging cones 39. The blower 34 is then operated, the damper 35 being opened to permit superheated air from the chamber 23* to be forced through the conduit 33 into the chamber 31 around the gas inlets 30, the air passing into the furnace being raised to a high temperature by means of its contact with the heated gas pipes 25—26—30. The oxygen and gas mixes when admitted into the chamber 31 and heats the ores contained therein to such an extent as to produce a white heat. When this has been accomplished the valve 38 is opened and steam admitted to the conduit 33 through the aspirator 37. The steam passing from said aspirator produces a suction in said pipe greatly increasing the temperature of the air passing through said aspirator and the steam is superheated by its contact with the intensely heated gas pipes 25—26 and the superheated air contained in the conduit 33 and passes into the chamber 31 in inflammable gas which produces upon said ores a most intense heat and causes the ores therein to become fused, the fumes and gases being separated from said ores passing through the vacuum draft 43 downwardly and into the tank 48. The aspirator 45 in the downward draft causes the water contained within the tank 48 to be in a constant turmoil. As these gases pass through the downward draft 43 they are cooled by means of the water spray 46 and as the gases pass through the water 50 into the further chamber contained within said tank 48 they are further purified and the volatile metallic fumes are precipitated or taken into the solution at the bottom of said tank, these metallic fumes overflowing through the trapped pipe 70 into the tank 71 where they are permitted to settle to be drawn off as desired. That portion of the gas passing into the further chamber of the tank 48 which has not been affected by transit though the water 50 contained therein passes through the outlet 51 into the chamber 52 and is caused to pass through the re-agent or other acid 54 contained within said tank where the other volatile metals and deleterious gases will be precipitated and removed from the gas to be utilized when desired. The gases not affected will pass through the outlet 55 into the gasometer 56 at which time the by-products contained within the fumes and gases will have all been drawn off in one or the other of the plurality of tanks through which said gas may have passed in transit to said gasometer. The gas contained within the gasometer may be utilized for any purpose desired and may be used in connection with the same apparatus by being burned beneath the superheater 23 to heat the gas used in the furnace 27.

The degree of heat necessary to be used in the apparatus depends entirely upon the character of the ore being treated as the various ores are melted at different degrees of temperature. The necessary degree of temperature to properly treat the ore to be operated upon may be nicely regulated by means of the valve 38 and damper 35 which devices will permit a greater or less amount of steam or air or both to pass through the conduit 33 into the chamber 31.

It is obvious that by this construction any number of parts of superheated gas, steam, or heated air may be united in any desired proportion and forced into the closed chamber 31 under any desired pressure and at any desired temperature to properly act upon the ores desired to be treated. As a result of such treatment the various by-products will be separated from the ores and pass from the furnace as fumes or gas to be precipitated in the various tanks while the metals will be separated therefrom in a comparatively pure state without the use of fluxes.

The furnace shown and described is adapted to treat all kinds of ores but it is not deemed necessary to describe in detail all of the ores which may be treated therein and the various by-products which may be derived therefrom. In order, however, to afford a better understanding of the operation of the furnace a single example will be given of the treatment of one specific ore and the by-products which may be secured from that particular ore. For instance in the furnace may be placed a copper sulfid which carries copper, gold, sulfur, silver, iron, and arsenic and brought to a low incandescent heat as herein described. By having absolute control of the gas utilized for heating purposes and keeping the heat therefrom at the required point where the sulfur and arsenic form chemical combinations with the free hydrogen in the gas, these elements may be drawn off by the vacuum draft partly as sulfurated hydrogen, partly as sulfur, partly as arsenerated hydrogen, and partly as arsenic. As the gas containing a high per cent. of hydrogen has a reducing effect the copper, gold, silver, and iron are left in the gangue in very near if not fully a metallic or elementary state. It is intended to keep an excess of hydrogen over oxygen in the heating gases thus insuring at all times a reducing flame.

The chemical combinations formed in the furnace may pass off in a combined state or independently of one another. When the ore has thus been treated it is passed through rolls and through a concentrating process as, for instance, tables, and the metals separated ready for the refiner. This feature, however, forms no part of the present invention.

When the gases formed within the furnace are drawn off through the outlet by the draft generated therein they are relieved of the sulfur and arsenic either in the first water bath 50 or by means of passing the gases through a precipitating bath such as is shown in the tank 71. Since the heat generated is caused by association and disassociation much of the combustion in the furnace is caused by the superheated gases and there is but a small amount of air utilized. Consequently the gases are pulled over into the gasometer 56 and are combined at this time with quantities of carbon unburned in the furnace, thus filling the gasometer with a hydrocarbon gas which is capable of use by being burned in the burner 59 beneath the gas superheater.

The furnace contemplates the using of all energies of heat both from fuel gases and the heat caused by the disassociation of the elements in the ore and by the association of certain elements of the ores such as sulfur and any volatile metal.

By superheating all of the heating gases which may be suitable for metallurgical work which are used in the furnace by means of other gases adapted to burn and produce sufficient heat for superheating purposes, the generated energy of association and disassociation in the furnace is enabled to be conserved and utilized.

The sulfur which is thrown down into the scrubbers and precipitating tanks may be part sulfur and part sulfurous acid. In like manner the arsenic which comes over is precipitated in a solid plate and is easily saved by filtration and drying.

The gases taken into the gasometer are principally hydrogen and carbon monoxid so combined as to have an excess of hydrogen and an effort is made to keep a sufficient quantity of carbon in the furnace to form with the oxygen so as to prevent the formation of any dioxids. Consequently the gas taken from the furnace is in a state for an association with oxygen and is readily combusted either under the furnace or under the superheater.

It is obvious from the foregoing description of the treatment of one particular ore that other ores combining different elements may be treated in substantially the same manner and the metallic elements separated therefrom in substantially the same way while the gases contained therein may be disassociated therefrom and collected in the gasometer to be utilized for heating purposes.

It is believed that the operation of the invention will be thoroughly understood from the foregoing without any further description.

Claims.

1. The combination of a casing forming a chamber closed at the sides and bottom; a plurality of inlets into said chamber immediately above the bottom for the admission of inflammable gas; and means for forcing air into said chamber through passages surrounding said gas inlets.

2. The combination of a casing forming a chamber closed at the sides and bottom; a plurality of inlets into said chamber immediately above the bottom for the admission of inflammable gas; and means for forcing steam into said chamber through passages surrounding said gas inlets.

3. The combination of a casing forming a chamber closed at the sides and bottom; a plurality of inlets into said chamber immediately above the bottom for the admission of inflammable gas; and means for forcing steam and air into said chamber through passages surrounding said gas inlets.

4. The combination of a casing forming a chamber closed at the sides and bottom and having a plurality of passages extending into said chamber immediately above said bottom; means for forcing air through said passages; and a gas discharge nozzle in each passage.

5. The combination of a casing forming a chamber closed at the sides and bottom and having a plurality of passages extending into said chamber immediately above said bottom; means for forcing air through said passages; a gas inlet nozzle in each passage; and a steam discharge nozzle communicating with a conduit leading to each of said passages.

6. The combination of a casing forming a chamber closed at the sides and bottom and having a plurality of passages extending into said chamber immediately above the bottom for the admission of inflammable gas; a gas nozzle in each passage; means for forcing air through said passages and surrounding said gas nozzles; a steam discharge nozzle communicating with a conduit leading to each of said passages; and means for heating said gas before its discharge through said inlets.

7. The combination of a casing forming a chamber closed at the sides and bottom and having a plurality of passages extending into said chamber; a gas nozzle in each passage; means for forcing air through said passages; means for heating said gas before its discharge into said nozzles; a conduit communicating with said passages; a steam discharge nozzle therein; and an aspirator in said conduit adapted to operate in connection with said steam nozzle.

8. The combination of a casing forming a chamber closed at the sides and bottom; a bottom hinged thereto; means for normally retaining said bottom in closed position; a plurality of gas inlet passages communicating with said chamber; and means for forcing air into said chamber through said passages and surrounding said gas inlets.

9. The combination of a casing forming a chamber closed at the sides and bottom; a bottom hinged thereto; means for normally retaining said bottom in closed position; a plurality of gas inlets into said chamber immediately above said bottom; means for forcing air into said chamber around said gas inlets; and means for forcing steam into said chamber with said air.

10. The combination of a casing forming a chamber closed at the sides and bottom; an air conduit surrounding the base of said furnace and communicating with said chamber by a plurality of air passages; a pipe within said conduit provided with a plurality of nozzles one of which extends through each of said air passages; means for forcing air through said conduit; means for admitting steam into said conduit; and a gas reservoir communicating with said pipe.

11. The combination of a casing forming a chamber closed at the sides and bottom; an air conduit surrounding the base of said furnace and communicating with said chamber by a plurality of air passages; a pipe within said conduit provided with a plurality of nozzles one of which extends through each of said air passages; means for forcing air through said conduit; means for admitting steam into said conduit; a gas reservoir communicating with said pipe; and means for heating the gas contained within said reservoir.

12. The combination of a casing forming a chamber closed at the sides and bottom; an air conduit surrounding the base of said furnace and communicating with said chamber by a plurality of air passages; a pipe within said conduit provided with a plurality of nozzles one of which extends through each of said air passages; means for forcing air through said conduit; means for admitting steam into said conduit; a gas reservoir communicating with said pipe; an outer casing to hold said gas reservoir; and means for heating the gases contained within the reservoir.

13. The combination of a casing forming a chamber closed at the sides and bottom; an air conduit surrounding the base of said furnace and communicating with said chamber by a plurality of air passages; a pipe within said conduit provided with a plurality of nozzles one of which extends through each of said air passages; means for forcing air through said conduit; means for admitting steam into said conduit; a gas reservoir communicating with said pipe; an outer casing to hold said gas reservoir; and a gas burner beneath said gas reservoir adapted to heat the gases contained therein.

14. The combination of a casing forming a chamber closed at the sides and bottom; a plurality of gas inlets into said chamber; a pipe with which said inlets communicate; a drum communicating with said pipe; a second drum; pipes connecting said drums; a pipe for admitting gas to the last mentioned drum; a casing inclosing said drums and pipes; and means within said casing beneath said pipes for heating the gas passing through said pipes from one drum to the other.

15. The combination of a casing forming a chamber closed at the sides and bottom and having a plurality of passages extending into said chamber; a gas inlet nozzle in each of said passages; a pipe communicating with said nozzles; a gas superheater communicating with said pipe; an air chamber surrounding said gas superheater adapted to superheat the air contained therein; a conduit communicating with said passages; and a pipe connecting said chamber with said conduit.

16. The combination of a casing forming a chamber closed at the sides and bottom and having a plurality of passages extending into said chamber; a gas inlet nozzle in each of said passages; a pipe communicating with said nozzles; a gas superheater communicating with said pipe; an air chamber surrounding said gas superheater adapted to superheat the air contained therein; a conduit communicating with said passages; a pipe connecting said chamber with said conduit; and means for forcing the superheated air from said chamber through said conduit and passages into said closed chamber.

17. The combination of a casing forming a chamber closed at the sides and bottom; means for heating said chamber; an outlet extending from the top of said chamber downwardly; a plurality of scrubbers communicating with said outlet; a gasometer communicating with the outlet from said scrubbers; a superheater provided with passages for the gas passing to said chamber; means for supplying gas to said chamber through said passages; and means extending from said gasometer to said superheater for the passage of gas from the former to the latter, and adapted to heat the other gases passing through said passages.

Signed by me at Boston, Massachusetts, this 22d day of September, 1906.

ALVA D. LEE.

Witnesses:
WALTER E. LOMBARD,
EDNA C. CLEVELAND.